(12) United States Patent
Bruck et al.

(10) Patent No.: US 9,821,414 B2
(45) Date of Patent: Nov. 21, 2017

(54) WELDING ELECTRODE

(71) Applicant: Siemens Energy, Inc., Orlando, FL (US)

(72) Inventors: Gerald J. Bruck, Oviedo, FL (US); Ahmed Kamel, Orlando, FL (US); David G. Maire, Winter Springs, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 141 days.

(21) Appl. No.: 14/732,976

(22) Filed: Jun. 8, 2015

(65) Prior Publication Data

US 2015/0266136 A1    Sep. 24, 2015

Related U.S. Application Data

(63) Continuation-in-part of application No. 13/754,983, filed on Jan. 31, 2013, now Pat. No. 9,393,644.

(51) Int. Cl.
*B23K 35/02* (2006.01)
*B23K 35/36* (2006.01)
(Continued)

(52) U.S. Cl.
CPC ........ *B23K 35/0272* (2013.01); *B23K 25/005* (2013.01); *B23K 35/0244* (2013.01);
(Continued)

(58) Field of Classification Search
CPC ............ B23K 35/0272; B23K 35/0266; B23K 35/3612; B23K 35/3033; B23K 35/304; B23K 35/322; B23K 35/327; B23K 35/362; B23K 35/383; B23K 35/0244; B23K 35/325; B23K 25/005
(Continued)

(56) References Cited

U.S. PATENT DOCUMENTS 1,835,899 A * 12/1931 Rode .................. B23K 35/0261
219/145.31
2,613,304 A * 10/1952 Colinet .............. B23K 35/0261
148/24

(Continued)

FOREIGN PATENT DOCUMENTS

JP          63097395 A    *    4/1988

OTHER PUBLICATIONS

PCT International Search Report and Written Opinion dated Aug. 24, 2016 corresponding to PCT Application No. PCT/US2016/032629 filed May 16, 2016 (13 pages).

*Primary Examiner* — Thien S Tran

(57) ABSTRACT

An electrode (10) is presented including a sheath (14) formed of a ductile material, an outer coating (16) including a flux material, and a core (12) including at least one of flux material and alloying material. The ductile material may be an extrudable subset of elements of a desired superalloy material and the alloying material may include elements that complement the ductile material to form a desired superalloy material when the electrode is melted. The outer coating may be formed of a flexible bonding material or it may be segmented (18, 20) to facilitate bending the electrode onto a spool. Any hygroscopic material of the electrode may be included in the core to protect it from exposure to atmospheric moisture.

12 Claims, 3 Drawing Sheets

(51) Int. Cl.

| | |
|---|---|
| *B23K 35/30* | (2006.01) |
| *B23K 35/32* | (2006.01) |
| *B23K 35/362* | (2006.01) |
| *B23K 35/38* | (2006.01) |
| *B23K 25/00* | (2006.01) |
| *C23C 24/10* | (2006.01) |

(52) U.S. Cl.
CPC ........ *B23K 35/0266* (2013.01); *B23K 35/304* (2013.01); *B23K 35/3033* (2013.01); *B23K 35/322* (2013.01); *B23K 35/325* (2013.01); *B23K 35/327* (2013.01); *B23K 35/362* (2013.01); *B23K 35/3612* (2013.01); *B23K 35/383* (2013.01); *C23C 24/106* (2013.01)

(58) Field of Classification Search
USPC ....... 219/61, 74, 76.1, 130.01, 137.2, 145.1, 219/145.22, 145.31, 145.32
See application file for complete search history.

(56) References Cited

U.S. PATENT DOCUMENTS

| | | | |
|---|---|---|---|
| 2,964,612 A * | 12/1960 | Savard | B23K 35/0283 219/137 R |
| 4,662,952 A | 5/1987 | Barringer et al. | |
| 5,272,305 A | 12/1993 | Endo et al. | |
| 5,575,933 A * | 11/1996 | Ni | B23K 35/365 219/145.31 |
| 2003/0062356 A1* | 4/2003 | Jiang | B23K 35/0261 219/145.31 |
| 2004/0173592 A1 | 9/2004 | Duncan et al. | |
| 2007/0193994 A1* | 8/2007 | Burt | B23K 35/0261 219/145.23 |
| 2007/0251602 A1* | 11/2007 | Gagnon | B23K 35/3602 148/26 |
| 2012/0223057 A1 | 9/2012 | Iordache et al. | |
| 2013/0140279 A1 | 6/2013 | Bruck et al. | |
| 2014/0209577 A1 | 7/2014 | Bruck et al. | |
| 2014/0263259 A1 | 9/2014 | Narayanan | |
| 2015/0027993 A1 | 1/2015 | Bruck et al. | |
| 2015/0099140 A1 | 4/2015 | Amata et al. | |

* cited by examiner

WELDING ELECTRODE

CROSS REFERENCE TO RELATED APPLICATIONS

This application is a continuation-in-part of U.S. patent application Ser. No. 13/754,983 filed 31 Jan. 2013, which is incorporated herein by reference.

FIELD OF THE INVENTION

This invention relates generally to the field of metals joining, and more particularly to the welding and repair of materials using a consumable electrode containing flux material.

BACKGROUND OF THE INVENTION

Welding electrodes are conventionally formed by multistep drawing of relatively ductile material from rods. As the material hardens from cold working (dislocation generation) during each drawing step, iterative annealing is performed to erase such cold working, reduce the strength and improve the ductility of the material for subsequent drawing steps. Superalloy materials which are used to manufacture gas turbine engines have extremely high strength and low ductility, even at very high temperatures. Due to these characteristics, annealing has limited ability to improve the ductility of superalloy materials. As a result, it is difficult to form welding electrodes from some superalloy materials, particularly the gamma prime strengthened alloys with high aluminum and titanium content, such as alloys 247, 738, 939, etc.

The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Shielded metal arc welding (SMAW) is a manual arc welding process that uses a consumable stick electrode covered with a flux. An electric current is used to form an electric arc between the electrode and the workpiece, thereby melting the electrode and a portion of the workpiece to form the weld joint. Because of the simplicity and versatility of SMAW, it is one of the world's most popular welding processes. One limitation of SMAW is the use of a rigid stick electrode, which generally prevents its application to continuous or automatic welding processes which typically feed a bendable electrode from a spool.

Flux-cored arc welding (FCAW) uses a tubular alloy electrode containing flux. Because the flux can be in powder form and is captured within the tubular alloy sheath, the electrode can be bent and stored in coil form, thereby facilitating continuous and automatic welding.

Conventional electrodes for welding have been formed from ductile material, such as stainless steel. For example, United States Patent Application Publication No. US 2004/0173592 A1 discloses an electrode including a stainless steel sheath encapsulating a core containing alloying and flux materials. Conventional electrodes have also been developed for welding some of the lower strength superalloy materials. For example, United States Patent Application Publication No. US 2012/0223057 A1 discloses a coated electrode used for gas tungsten arc welding of certain superalloys. The electrode includes a solid core formed from the superalloy material and an outer coating of flux material.

BRIEF DESCRIPTION OF THE DRAWINGS

The invention is explained in the following description in view of the drawings that show.

DETAILED DESCRIPTION OF THE INVENTION

The present inventors are working to develop improved techniques for the deposition and repair of high strength gamma prime strengthened superalloys as are commonly used for gas turbine hot gas path components. They have developed laser powder deposition techniques that can be used to successfully deposit even the highest strength superalloys. See, for example, United States Patent Application Publication No. US 2013/0140279 A1, incorporated by reference herein, which describes (FIG. 6 of that application) difficult to weld superalloys as a function of their aluminum and titanium content, referred to herein as gamma prime strengthened superalloys. The inventors have also recognized that no conventional welding electrode is available for continuous or automatic welding of these gamma prime strengthened superalloys.

Figure 1:
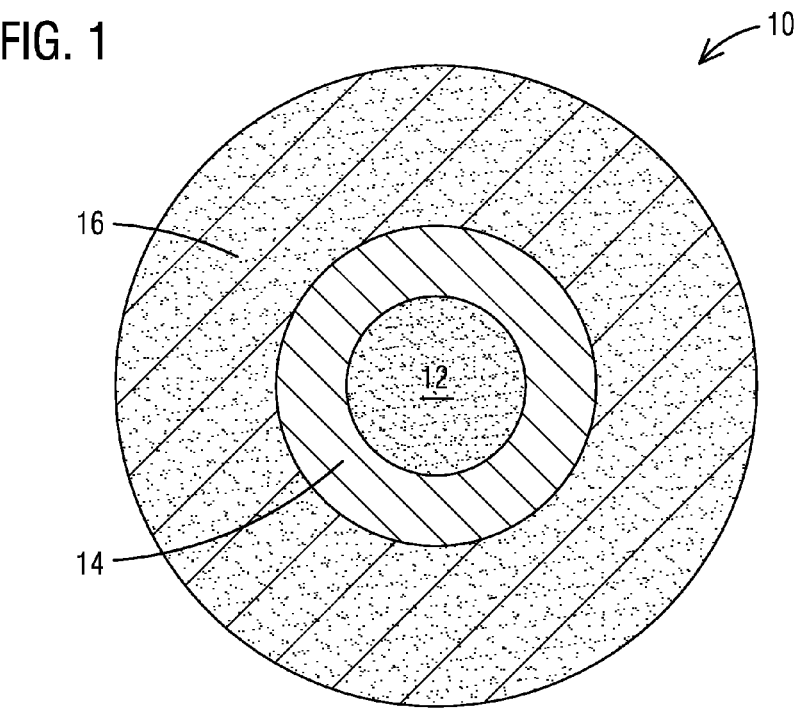
FIG. 1 is a radial cross-sectional view of an electrode.

FIG. 1 is a radial cross-sectional view of an electrode 10 including a sheath 14 surrounding a core 12. Additionally, as depicted in FIG. 1, the sheath 14 has an outer coating 16. In various embodiments of the electrode 10, the core 12 and the outer coating 16 include different materials, as discussed below. In each embodiment of the electrode 10, the sheath 14 is formed from a ductile material, such as an extrudable subset of elements of a composition of elements defining a desired superalloy material. In an exemplary embodiment, the ductile material is pure nickel or nickel-chromium or nickel-chromium-cobalt, for example. Ductile materials, as used herein, are those materials having a minimum elongation of ten percent and which are capable of being drawn into wire form by cold extrusion with appropriate annealing iterations, typical of stainless steel and wrought nickel-based alloys (as opposed to cast superalloys). In an exemplary embodiment, the core 12 includes powdered alloying material that includes elements that complement the elements in the ductile material to complete the composition of elements defining the desired superalloy material. In an exemplary embodiment, the alloying material includes one or more of Cr, Co, Mo, W, Al, Ti, Ta, C, B, Zr and Hf. Flux material may be included in the outer coating 16 and/or in the core 12. Flux in the core 12 may be in powder form, and the outer coating 16 may be deposited as a monolithic coating or may be powder held in a binder material. As appreciated by one skilled in the art, the flux material provides slag functions and may provide a covering gas when the electrode 10 is melted. In an exemplary embodiment, the flux material is non-metallic powder, such as alumina, fluorides and silicates, for example.

In one embodiment of the electrode 10, the core 12 is formed from the alloying material, the sheath 14 is made from the ductile material, and the outer coating 16 is formed from the flux material.

In another embodiment of the electrode 10, the core 12 is formed from the alloying material, the sheath 14 is made from the ductile material, and the outer coating 16 is formed from the alloying material and the flux material.

In another embodiment of the electrode 10, the core 12 is formed from the alloying material and flux material, the sheath 14 is made from the ductile material, and the outer coating 16 is formed from flux material.

In another embodiment of the electrode 10, the core 12 is formed from flux material, the sheath 14 is made from the ductile material, and the outer coating 16 is formed from the alloying material and flux material.

In another embodiment of the electrode 10, the core 12 is formed from the alloying material and flux material, the sheath 14 is made from the ductile material, and the outer coating 16 is formed from the alloying material and flux material.

In another embodiment of the electrode 10, the core 12 is formed from the flux material, the sheath 14 is made from the ductile material, and the outer coating 16 is formed from the alloying material. In an exemplary embodiment, the alloying material is formed in the outer coating 16 using electroplating.

In another embodiment of the electrode 10, the core 12 is formed from the flux material and the alloying material, the sheath 14 is made from the ductile material, and the outer coating 16 is made from the alloying material.

In another embodiment of the electrode 10, the outer coating 16 is formed from flux material encased with a flexible bonding material such as cellulose material, so that the electrode 10 can be wound on a reel. In an exemplary embodiment, a thin coating of cellulose material such as fibrous and braided cellulose is used to provide flexibility for winding the electrode 10 on the reel. Particles of flux material and/or alloying material may be supported in the outer coating 16 with cellulose material, or fibrous cellulose material may be coated with flux material and/or alloying material in the outer coating 16. In addition to enhancing the flexibility of the electrode 10, the cellulose material may contribute to shielding by generating one or more gases such as carbon monoxide, carbon dioxide and hydrogen, for example.

In another embodiment of the electrode 10, the core 12 contains any hygroscopic material used in the electrode, and the outer coating 16 includes no hygroscopic material. Hygroscopic materials, such as finely powdered metal alloys, agglomerated fluxes, and binder agents such as water glass ($Na_2(SiO_3)$) and sodium silicates ($Na_2(SiO_2)_nO$) are known to absorb moisture if exposed to the atmosphere, which is problematic for a welding electrode due the disassociation of the water to form hydrogen and oxygen at welding temperatures. Prior art flux coated electrodes are kept dry by being stored at an elevated temperature prior to use. The present invention can eliminate this concern by keeping all hygroscopic materials protected from the atmosphere by being contained within the core 12. In an exemplary embodiment, only non-hygroscopic materials are provided in the outer coating 16. Non-hygroscopic materials include materials such as fused flux constituents or specially devised reaction products, as taught in U.S. Pat. No. 4,662,952.

In those embodiments where the outer coating 16 is formed from flux material, the electrode 10 may be used in shielded metal arc welding (SMAW) of gamma prime strengthened superalloys. However, the embodiments of the electrode 10 discussed above are not limited to use in SMAW and may be used in any type of common arc welding, such as gas tungsten arc welding (GTAW), gas metal arc welding (GMAW), submerged arc welding (SAW) and flux cored arc welding (FCAW), for example.

Figure 2:
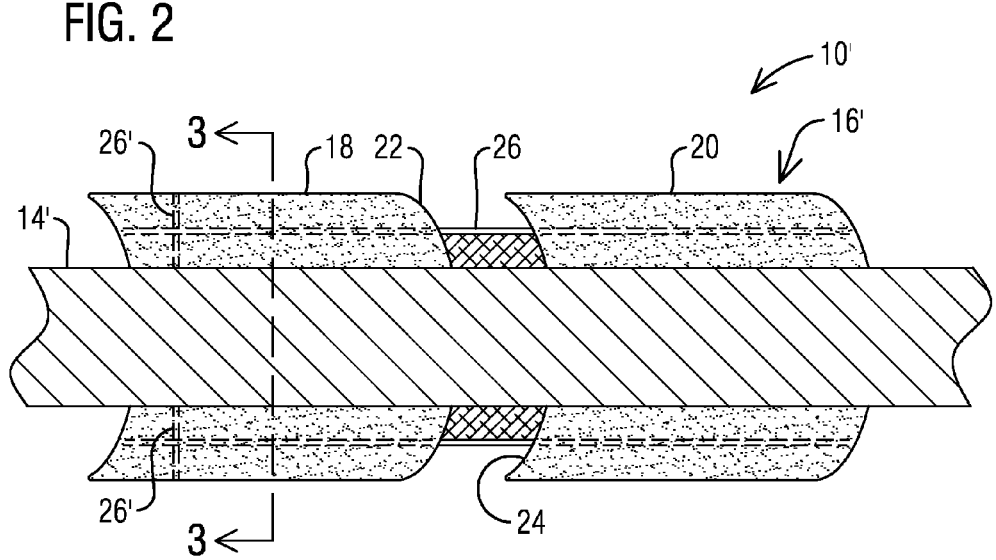
FIG. 2 is an axial cross-sectional view of an electrode.
Figure 3:
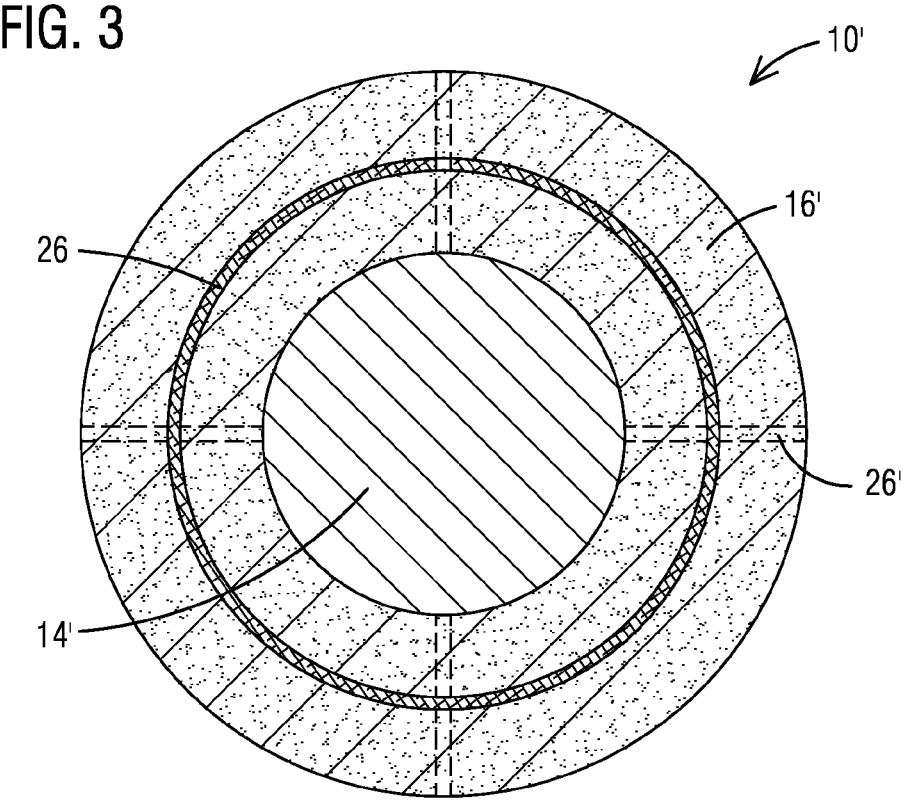
FIG. 3 is a radial cross-sectional view of the electrode of FIG. 2 taken along the line 3-3.

FIG. 2 is an axial cross-sectional view of an electrode 10'. FIG. 3 is a radial cross-sectional view of the electrode 10' of FIG. 2 taken along the line 3-3. The electrode 10' includes a wire 14' of ductile material that is a solid core of ductile material. The wire 14' of the electrode 10' is covered by an outer coating 16' that is segmented into a plurality of segments 18, 20 of flux material. FIG. 2 depicts a length portion of the electrode 10' with two segments 18, 20 of the segmented outer coating 16', and thus one skilled in the art will appreciate that the segmented outer coating 16' may include two or more segments.

The segments 18, 20 of the outer coating 16' may optionally feature cooperative arcuate surfaces on opposed ends, such that a convex surface 22 adjoins, and may touch, a concave surface 24 on an adjacent segment. The arcuate adjacent surfaces advantageously facilitate the electrode 10' being wound on a reel, since the arcuate adjacent surfaces permit the segments 18, 20 to rotate relative to each other while minimizing a gap between the segments 18, 20. The wire 14' is formed of a ductile material that will bend without cracking, and the segmented outer coating 16' allows a relatively brittle coating, such as a coating of flux material, to bend without cracking. Although FIG. 2 depicts that the segments 18, 20 feature adjacent convex and concave surfaces, the segmented outer coating is not limited to this arrangement. For example, the segments may be adjacent spherical segments (e.g. beads) with both of the adjoining arcuate surfaces being convex. In another example, the adjacent segments include one arcuate surface that is concave and an adjoining arcuate surface that is convex and is nesting against the concave surface. In another example, the segments may be adjacent cylindrical segments with adjacent surfaces that are parallel to each other or that include adjacent concave and convex surfaces that are nesting against each other, for example. The segments allow the ductile core wire material to be bent without damage to the relatively brittle coating material, but the segments are not limited to any particular shape.

When the electrode 10' is wound on a reel, one end of the electrode 10' may exclude the segments 18, 20, so that a power supply can be connected to the wire 14' at that end. The power supply may be connected to the wire 14' using a slip ring, so that the power supply need not turn with the electrode 10' on the reel.

As further depicted in FIGS. 2-3, the electrode 10' may include fibers 26 within the segmented outer coating 16' that optionally may extend between the segments 18, 20. The fibers 26 can be useful in reinforcing the outer coating 16', and as the fibers 26 proceed from segment 18 to segment 20, they connect the segments 18, 20 together while still providing flexibility for bending the electrode 10' onto a spool. In one exemplary embodiment, the ductile material of the wire 14' is an extrudable subset of elements of a composition of elements defining a desired superalloy material, and the fibers 26 include metallic elements that complement the ductile material to form the desired superalloy material when the electrode is melted. The fibers 26 may form a metal screen encircling the core wire 14' with the segments 18, 20 of flux material disposed along a length of the metal screen, such that the segments 18, 20 are allowed to displace relative to each other as the electrode is bent due to the flexibility of the screen between the segments 18, 20. In other embodiments, the fibers 26 may be ceramic fibers, and the material of the ceramic fibers may provide a fluxing function. In an exemplary embodiment, as depicted in FIG. 3, fibers 26' may extend radially within the outer coating 16 to make contact with the wire core 14' to effect electrical continuity between the fibers 26 and the wire 14'. This arrangement facilitates electrical continuity between a power supply (not shown) and the wire 14' through the fibers 26, 26'. For example, the power supply may make electrical contact with the fibers 26' through electrode drive wheels (not shown) that contact an outermost surface of the electrode 10', and thereby be in electrical connection with the wire 14'. This electrical continuity eliminates the need for a bare connection of the wire 14' to the power supply at the end of the reel. Although FIG. 3 depicts four metal fibers 26' positioned at various radial locations between the fibers 26 and wire 14', the embodiment is not limited to this arrangement and may include less or more than four metal fibers 26' that may be positioned at other radial locations than those depicted in FIG. 3.

Although FIGS. 2-3 depict the fibers 26 within the segmented outer coating 16', other embodiments include a segmented outer coating 16' without reinforcing fibers, such as a plurality of segments 18, 20 of flux material without reinforcing fibers. Moreover, reinforcing fibers may optionally be included in the outer coating 16 of FIG. 1. In another exemplary embodiment, the ductile material of the wire 14' is an extrudable subset of elements of a composition of elements defining a desired superalloy material, and the outer coating 16' comprises alloying material including elements that complement the ductile material to form the desired superalloy material when the electrode is melted.

Although FIGS. 2-3 depict that the wire 14' includes a solid core of ductile material, the electrode 10' may optionally feature a sheath of ductile material with a hollow core, as depicted in FIG. 1, where alloying material and/or flux is contained within the core 12.

Figure 4:
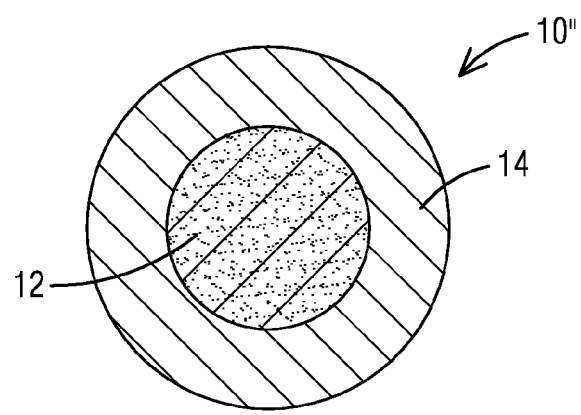
FIG. 4 is a radial cross-sectional view of an electrode.

FIG. 4 is a radial cross-sectional view of an electrode 10'' having a sheath 14 formed from a ductile material, such as an extrudable subset of elements of a composition of elements defining a desired superalloy material. In this embodiment of the electrode 10'', the core 12 is formed from flux material and alloying material. In an exemplary embodiment, the alloying material is a powdered metal material that includes elements that complement the elements in the ductile material to complete the composition of elements defining the desired superalloy material.

Figure 5:
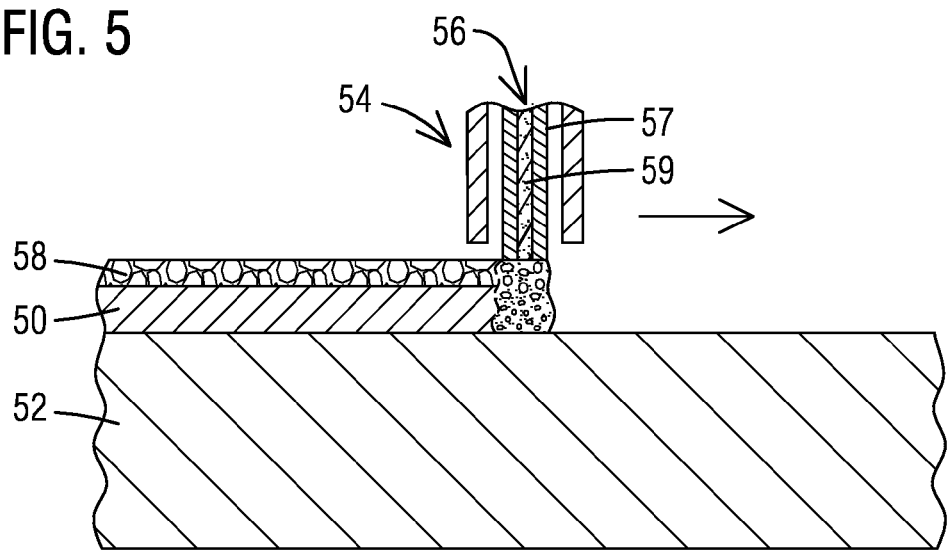
FIG. 5 is a cladding process using the electrode of FIG. 4 and a cold metal arc welding torch.

FIG. 5 illustrates an embodiment where a layer of high strength gamma prime precipitant strengthened superalloy material 50 is deposited onto a superalloy substrate 52 using a cold metal arc welding torch 54. The torch 54 is used to feed and to melt the electrode 10'' of FIG. 4, including filler material 56 having the form of a cored wire or strip material including a hollow metal sheath 57 filled with a powdered core material 59. The powdered core material 59 may include alloying material, such as powdered metal and/or flux materials. Advantageously, the metal sheath 57 is formed of a material that can be conveniently formed into a hollow shape, such as nickel or nickel-chromium or nickel-chromium-cobalt, and the powdered material 59 is selected such that the desired superalloy composition is formed when the filler material 56 is melted. The sheath contains sufficient nickel (or chromium or cobalt) to achieve the desired superalloy composition, thus the solid to solid ratio of sheath verses powdered core material may be maintained at a ratio of 3:2, for example. The heat of the arc melts the filler material 56 and forms a layer of the desired superalloy material 50 covered by a layer of slag 58. Powdered flux material may be provided in the filler material 56 (for example 25% of the core volume), or the electrode may be coated with flux material, or any combination of these alternatives. A supplemental powdered metal material may also be added to the melt pool by being pre-placed on the surface of the substrate 52 or by being directly fed into the melt pool during the step of melting. In various embodiments, the flux may be electrically conductive (electroslag) or not (submerged arc), and it may be chemically neutral or additive. The filler material may be preheated to reduce process energy required—in this case from the cold metal arc torch. The use of flux would provide shielding thereby reducing or eliminating the need for inert or partially inert gas commonly required in the cold metal arc process. Other processes that may be applied using the consumables and methodologies herein described include gas metal arc welding, flux cored arc welding, submerged arc welding (including strip and wire), electroslag welding (including strip and wire), plasma arc welding and gas tungsten arc welding with wire.

Figure 6:
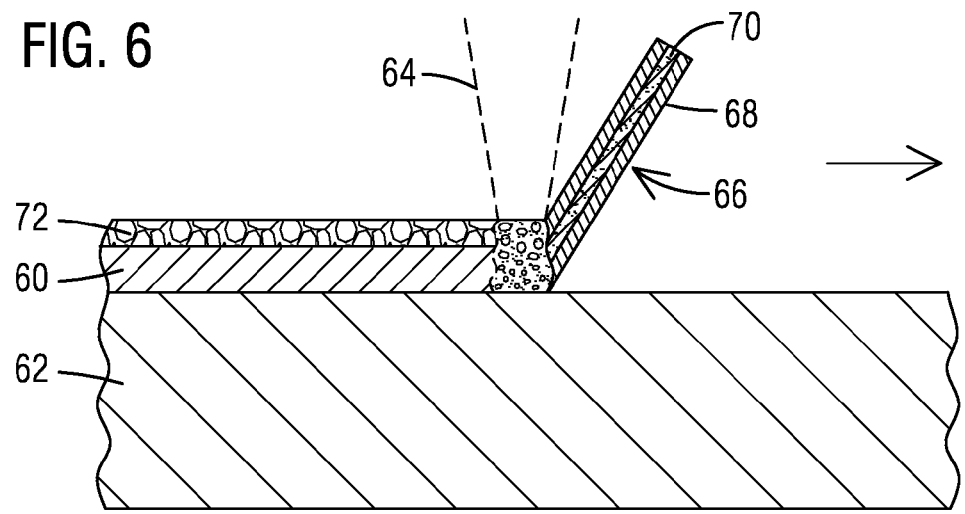
FIG. 6 is a cladding process using the electrode of FIG. 4 and an energy beam.

FIG. 6 illustrates an embodiment where a layer of gamma prime strengthened superalloy material 60 is deposited onto a superalloy substrate 62 using an energy beam such as laser beam 64 to melt the electrode 10'' of FIG. 4, including filler material 66. As described above with respect to FIG. 5, the filler material 66 includes a metal sheath 68 that is constructed of a material that can be conveniently formed into a hollow shape, such as nickel or nickel-chromium or nickel-chromium-cobalt, and a powdered material 70 is selected such that a desired superalloy composition is formed when the filler material 66 is melted by the laser beam 64. The powdered material 70 may include powdered flux as well as alloying material. The heat of the laser beam 64 melts the filler material 66 and forms a layer of the desired superalloy material 60 covered by a layer of slag 72. As before, the filler material may be preheated, such as with an electrical current, to reduce process energy required—in this case from the laser beam. Additionally, use of hybrid processes is also envisioned, including, for example, a combination of laser and arc welding.

One embodiment of the electrodes discussed above is formulated to deposit alloy 247 material as follows:
  sheath solid volume is about 60% of total metallic solid volume and is pure Ni;
  core metal powder volume is about 40% of total metallic solid volume including sufficient Cr, Co, Mo, W, Al, Ti, Ta, C, B, Zr and Hf; that when melted together and mixed with the pure nickel from the sheath, produces alloy 247 composition of nominal weight percent 8.3 Cr, 10 Co, 0.7 Mo, 10 W, 5.5 Al, 1 Ti, 3 Ta, 0.14 C, 0.015 B, 0.05 Zr and 1.5 Hf; and
  core flux powder volume represents additional, largely non-metallic, wire volume possibly about equal in size to the metal powder volume and includes various oxides, such as alumina, fluorides and silicates in a 35/30/35 ratio. The mesh size range of the flux is such as to distribute uniformly within the core metal powder.

Although FIGS. 5-6 depict welding techniques that are used with the electrode 10'' of FIG. 4, these welding techniques may be employed for any of the embodiments of the electrodes discussed above in relation to FIGS. 1-4. Additionally, any common type of arc welding appreciated by one skilled in the art, may be used with the electrodes of FIGS. 1-4, including shield metal arc welding (SMAW), for example.

For embodiments where the heat of melting is provided by an arc, it is common to provide oxygen or carbon dioxide in the flux or shielding gas in order to maintain arc stability. However, the oxygen or carbon dioxide will react with titanium and some of the titanium will be lost as vapor or oxides during the melting process. The present invention allows the amount of titanium included in the filler material to be in excess of the amount of titanium desired in the deposited superalloy composition to compensate for this loss. For the example of alloy 247 described above, the amount of titanium included in the core metal powder may be increased from about 1% up to about 3%.

One will appreciate that other alloys, such as stainless steels for example, may be deposited with a similar process where a cored feed material is filled with a powdered core material including powdered flux and powdered metal. The powdered metal may be used to augment the composition of the sheath material to obtain a cladding material of a desired chemistry. For embodiments where there is a loss of material due to vaporization during the melting step, the powdered metal may include an excess of the lost material to compensate for the loss. For example, when alloy 321 stainless steel sheath material is deposited under a shielding gas containing oxygen or carbon dioxide or where incomplete shielding is provided by an inert shield gas, some of the titanium from the sheath material is lost due to reaction with the oxygen or carbon dioxide or an incomplete shielding atmosphere. The powdered core material in such an embodiment may include powdered flux and powdered titanium or titanium alloy to compensate for the loss, thus providing a desired alloy 321 cladding composition.

Flux materials which could be used include commercially available fluxes such as those sold under the names Lincolnweld P2007, Bohler Soudokay NiCrW-412, ESAB OK 10.16 or 10.90, Special Metals NT100, Oerlikon OP76, Sandvik 50SW or SAS1, or fluxes described in the inventors' United States Patent Application Publication No. US 2015/0027993 A1, incorporated by reference herein. The flux particles may be ground to a desired smaller mesh size range before use. Flux materials known in the art may typically include various oxides, such as alumina, fluorides and silicates. Embodiments of the processes disclosed herein may advantageously include metallic constituents of the desired cladding material, for example chrome oxides, nickel oxides or titanium oxides. Any of the currently available iron, nickel or cobalt based superalloys that are routinely used for high temperature applications such as gas turbine engines may be joined, repaired or coated with the inventive process, including those alloys mentioned above.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An electrode comprising:
   a sheath formed of a ductile material;
   an outer coating comprising flux material disposed on the sheath, wherein the outer coating comprises a plurality of discrete segments of the flux material, wherein the plurality of discrete segments comprise non-parallel arcuate ends formed to cooperate with respective ends of adjacent discrete segments to facilitate bending of the electrode; a core comprising at least one of flux material and alloying material disposed within the sheath;
   wherein the outer coating comprises a cellulose bonding material with adequate flexibility to facilitate bending of the electrode onto a spool; wherein the bonding material comprises fibrous cellulose; and
   wherein fibers extend inward from an outermost surface of the electrode to make contact with the core.

2. The electrode of claim 1, wherein the outer coating further comprises alloying material.

3. The electrode of claim 1, wherein the core comprises both flux material and alloying material.

4. The electrode of claim 1, wherein the outer coating further comprises fibers.

5. The electrode of claim 1, further comprising fibers interconnecting adjacent ones of the discrete segments.

6. The electrode of claim 1, wherein the core comprises hygroscopic material and the outer coating comprises no hygroscopic material.

7. An electrode comprising:
   a sheath;
   a core comprising a flux material and an alloying material disposed within the sheath;
   wherein the sheath comprises an extrudable subset of elements of a desired superalloy material and wherein the alloying material comprises elements that complement the sheath to form the desired superalloy material when the electrode is melted;
   an outer coating comprising a plurality of discrete segments;
   wherein the segments comprise non-parallel arcuate ends formed to cooperate with respective ends of adjacent segments to facilitate bending of the electrode;
   wherein the outer coating comprises a cellulose bonding material with adequate flexibility to facilitate bending of the electrode onto a spool; wherein the bonding material comprises fibrous cellulose; and
   wherein fibers extend inward from an outermost surface of the electrode to make contact with the core.

8. The electrode of claim 7, further comprising an outer coating comprising at least one of alloying material and flux material.

9. The electrode of claim 7, further comprising fibers interconnecting adjacent ones of the discrete segments.

10. The electrode of claim 7, wherein any hygroscopic material of the electrode is disposed in the core.

11. An electrode characterized by a segmented outer coating disposed along an axial length of a central core; wherein the segmented outer coating comprises a plurality of segments with respective adjacent non-parallel arcuate end surfaces;
   wherein the segmented outer coating comprises a cellulose bonding material with adequate flexibility to facilitate bending of the electrode onto a spool; wherein the bonding material comprises fibrous cellulose; and
   wherein fibers extend inward from an outermost surface of the electrode to make contact with the central core.

12. The electrode of claim 10, further comprising reinforcing fiber interconnecting adjacent segments of a segmented outer coating.

* * * * *